United States Patent
Zhou et al.

(10) Patent No.: US 12,044,779 B2
(45) Date of Patent: Jul. 23, 2024

(54) METHODS AND SYSTEM FOR ANALYZING DYNAMIC LIDAR POINT CLOUD DATA

(71) Applicant: Argo AI, LLC, Pittsburgh, PA (US)

(72) Inventors: Patrick Zhou, Princeton, NJ (US); Yijun Tang, Horsham, PA (US); Guillaume Binet, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 885 days.

(21) Appl. No.: 17/115,006

(22) Filed: Dec. 8, 2020

(65) Prior Publication Data
US 2022/0179082 A1 Jun. 9, 2022

(51) Int. Cl.
| | |
|---|---|
| *G01S 17/89* | (2020.01) |
| *G01S 17/931* | (2020.01) |
| *G05D 1/00* | (2024.01) |
| *G06F 16/51* | (2019.01) |
| *G06T 1/00* | (2006.01) |
| *G06T 1/60* | (2006.01) |

(52) U.S. Cl.
CPC ............ *G01S 17/89* (2013.01); *G01S 17/931* (2020.01); *G05D 1/0231* (2013.01); *G06F 16/51* (2019.01); *G06T 1/0007* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 11,516,453 | B2 * | 11/2022 | Takahashi | H04N 13/178 |
| 2016/0035081 | A1 * | 2/2016 | Stout | G01S 17/931 |
| | | | | 382/103 |
| 2019/0087979 | A1 | 3/2019 | Mammou et al. | |
| 2020/0200905 | A1 * | 6/2020 | Lee | G01S 17/58 |
| 2020/0302650 | A1 * | 9/2020 | Aksu | G06T 9/00 |
| 2021/0011163 | A1 * | 1/2021 | Zhang | G01S 17/931 |

FOREIGN PATENT DOCUMENTS

| | | | | |
|---|---|---|---|---|
| CN | 111860198 A | * | 10/2020 | ............ G01S 17/89 |
| CN | 111860198 A | | 10/2020 | |
| EP | 0928451 A1 | | 7/1999 | |
| EP | 3712854 A1 | | 9/2020 | |

(Continued)

OTHER PUBLICATIONS

CN 111860198 A English (Year: 2020).*

(Continued)

*Primary Examiner* — Yuqing Xiao
*Assistant Examiner* — Jempson Noel
(74) *Attorney, Agent, or Firm* — Fox Rothschild LLP

(57) ABSTRACT

A system includes a computer-readable memory for storage and retrieval of LiDAR data. The memory includes one or more point cloud data structures, each point cloud data structure including a first header block, and a plurality of point blocks. Each of the plurality of point blocks is configured to store at least a portion of LiDAR point cloud data. The memory includes one or more image data structures having a second header block, and a plurality of image column blocks. Each image column block includes a column of pixels of a corresponding image from the LiDAR point cloud data, and the image column blocks collectively contain all pixels of the corresponding image.

24 Claims, 13 Drawing Sheets

(56) References Cited

FOREIGN PATENT DOCUMENTS

| WO | 2017154705 A1 | 9/2017 |
| WO | 2020005365 A1 | 1/2020 |
| WO | 2020071703 A1 | 4/2020 |
| WO | 2020190114 A1 | 9/2020 |

OTHER PUBLICATIONS

International Search Report and Written Opinion mailed Jan. 22, 2022 in Applicaton No. PCT/US2021/058544.
"LAS Specification" Version 1.2, Approved by ASPRA Board Sep. 2, 2008, 13 pages, available at https://www.asprs.org/a/society/committees/standards/asprs_las_format_v12.pdf.

* cited by examiner

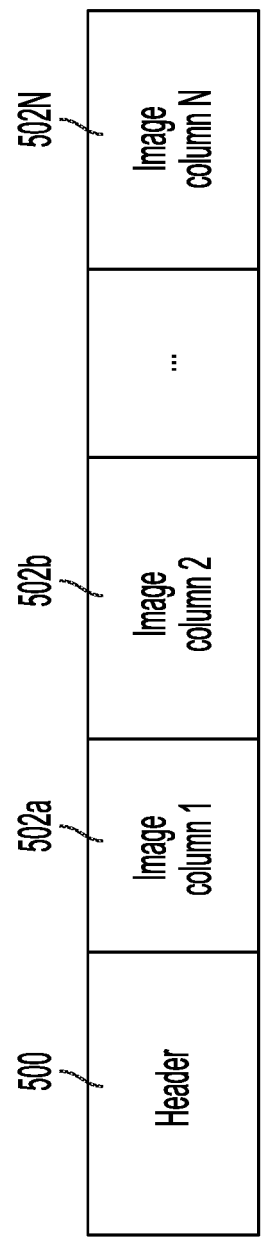

METHODS AND SYSTEM FOR ANALYZING DYNAMIC LIDAR POINT CLOUD DATA

BACKGROUND

Existing point cloud processing systems typically open standard point cloud file formats such as, for example, .ply and .xyz files, one at a time. This makes continuously streaming LiDAR data into these point cloud processing systems to visualize data captured in a sequence of scenes difficult. Rather, existing point cloud processing systems are typically limited to analyzing static-scene point cloud data. In addition, there are usually significant discrepancies between proprietary LiDAR data formats and a common point cloud data format utilized by existing point cloud processing systems. As such, proprietary point cloud visualization software programs are typically developed for each applicable LiDAR model.

This document describes methods and systems that are directed to addressing the problems described above, and/or other issues.

SUMMARY

In various embodiments, a system includes an electronic device and a computer-readable medium having one or more programming instructions. The system receives a stream of one or more frames of LiDAR data from one or more LiDAR sensors of one or more autonomous vehicle. The LiDAR data includes point cloud data pertaining to one or more images. The system assigns at least a portion of the LiDAR data into one or more point cloud data structures, and each point cloud data structure includes a first header block and a plurality of point blocks. The system assigns at least a portion of the LiDAR data into one or more image data structures having a second header block, and a plurality of image column blocks. Each image column block includes a column of pixels of a corresponding image from the one or more images, and the image column blocks collectively contain all pixels of the corresponding image. The system generates a batch including one or more of the following: one or more of the point cloud data structures, or one or more of the image data structures, and the system provides the batch to a point cloud processing system.

The system may cause the electronic device to assign at least a portion of the LiDAR data into one or more point cloud data structures by storing part of the at least a portion of the LiDAR data in each of the plurality of point blocks. The first header block may include a source indicator that identifies a source of the LiDAR data that is stored in the plurality of point blocks.

One or more of the point cloud data structures may include, for each of the point blocks, a size block that immediately precedes the corresponding point block and that includes an indicator of size of the corresponding point block.

One or more of the plurality of point blocks may include an indicator of size of the point block.

The first header block may include a data type indicator indicating a data type of the point cloud data structure.

The first header block may include a follower indicator that identifies a data type of a data structure that follows the point cloud data structure in memory.

The system may cause the electronic device to assign at least a portion of the LiDAR data into one or more image data structures by storing part of the at least a portion of the LiDAR data in each of the plurality of image column blocks.

The second header may include a source indicator that identifies a source of the LiDAR data that is stored in the plurality of image column blocks.

The second header block may include a data type indicator indicating a data type of the image data structure.

The second header block may include a follower indicator that identifies a data type of a data structure that follows the image data structure in memory.

The second header block may include an indication of a how many image columns are stored by the corresponding image data structure.

The second header block may include an indication of a size of one or more of the image column blocks.

In various embodiments, a system includes a computer-readable memory for storage and retrieval of LiDAR data. The memory includes one or more point cloud data structures, each point cloud data structure including a first header block, and a plurality of point blocks. Each of the plurality of point blocks is configured to store at least a portion of LiDAR point cloud data. The memory includes one or more image data structures having a second header block, and a plurality of image column blocks. Each image column block includes a column of pixels of a corresponding image from the LiDAR point cloud data, and the image column blocks collectively contain all pixels of the corresponding image.

BRIEF DESCRIPTION OF THE DRAWINGS

FIGS. 2A and 2B illustrate example point cloud data structures.

FIG. 5 illustrates an example image data structure.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

This document describes a novel point cloud data structure and image data structure that can be used to stream LiDAR data into one or more point cloud processing systems via one or more data channels. As discussed in more detail below, LiDAR data points can be allocated to the data structure(s) which facilitate it being streamed into one or more point cloud processing systems on an on-going basis for various purposes, such as, for example, visualization and analysis purposes.

Figure 1:
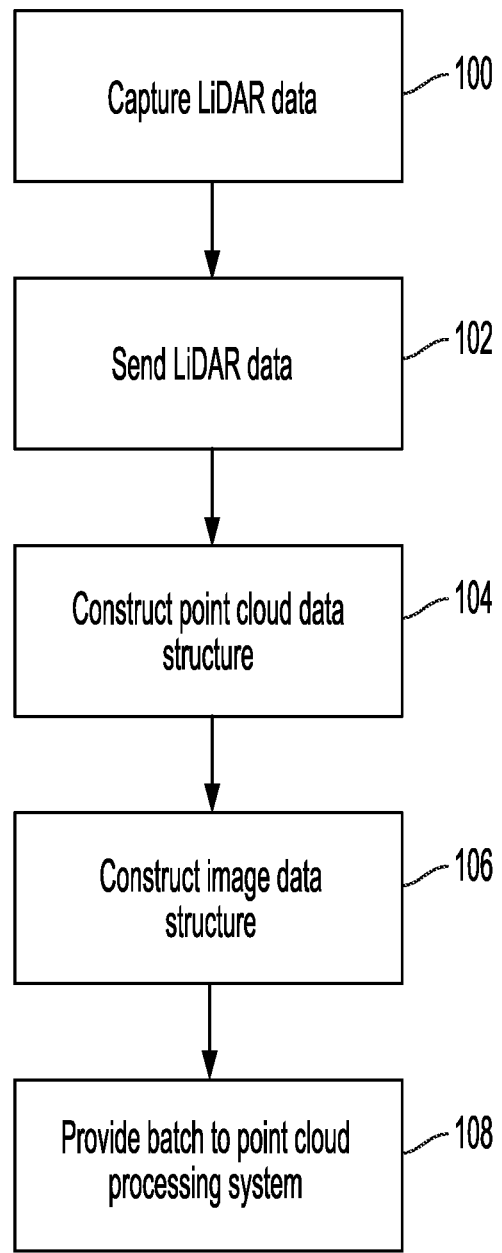
FIG. 1 illustrates a flow chart of example method of processing LiDAR point cloud data.

FIG. 1 illustrates a flow chart of example method of processing LiDAR point cloud data according to an embodiment. As illustrated by FIG. 1, an autonomous vehicle may capture 100 LiDAR point cloud data. An autonomous vehicle may capture LiDAR point cloud data via one or more LiDAR sensors. The LiDAR point data may be captured 100 as one or more frames. For instance, a vertical 2D LiDAR sensor may scan through a cylindrical space by rotating along a parallel axis in the space. The LiDAR point data that is obtained by the sensor may be in the format of frames, which may include measurements of the sensor at each time the sensor obtains a measurement. As such, an autonomous vehicle may capture 100 a data set of LiDAR point data that is configured in one or more frames. The autonomous vehicle may continuously capture 100 LiDAR point data while the LiDAR sensors are operational.

The autonomous vehicle may send 102 at least a portion of the captured frames to one or more electronic devices. In various embodiments, an autonomous vehicle may send 102 captured frames to one or more electronic devices in a continuous (or substantially continuous) basis. In this way, the autonomous vehicle may stream captured LiDAR point cloud data to one or electronic devices. The electronic devices may be located remotely from the autonomous vehicle, and may be part of a point cloud analysis platform or other system or platform.

In various embodiments, one or more electronic devices may receive captured frames from one or more autonomous vehicles. The autonomous vehicles may be part of the same fleet, or they may not be part of the same fleet. There may be differences between the LiDAR data formats associated with these autonomous vehicles. For instance, some autonomous vehicles may support a proprietary data format, while other autonomous vehicles may support a different proprietary data format. In order for the LiDAR data captured by both autonomous vehicles to be visualized and/or otherwise analyzed or processed by a point cloud processing system, this data may be translated into a common format.

As described in more detail below, this common format may include one or more data structures. A data structure refers to an arrangement of memory that organizes, manages and/or stores a collection of data in a certain format. A data structure may include one or more blocks. A block refers to an entry of a data structure in which certain information is stored. Blocks of a data structure may be arranged or configured to enable efficient access to and/or modification of data stored within the block.

One or more electronic devices may construct 104 a point cloud data structure based on at least a portion of the LiDAR point cloud data associated with the sent frames.

Figures 2A, 2B:
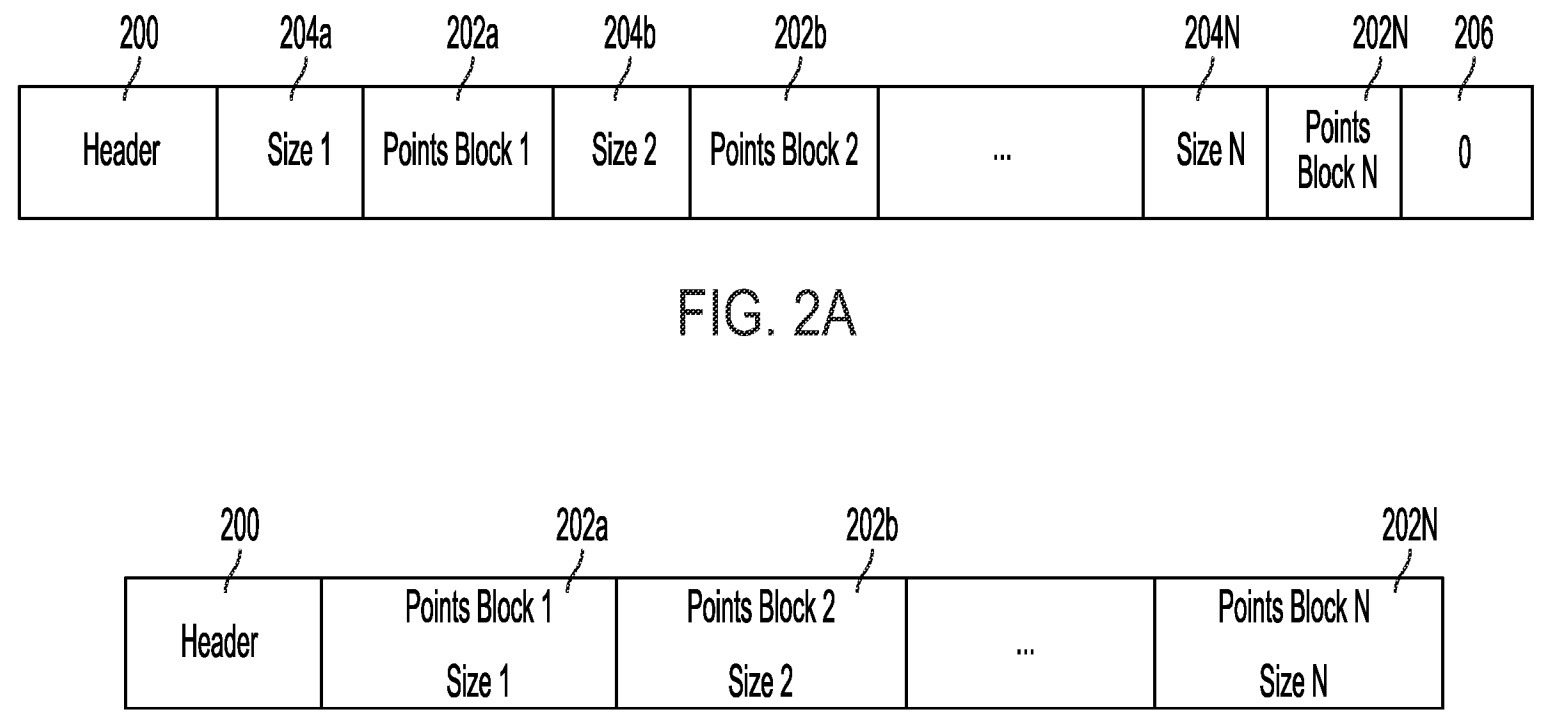

FIG. 2A illustrates an example point cloud data structure. As shown in FIG. 2A, a point cloud data structure may include a header block 200, one or more point blocks 202a-N, and one or more size blocks 204a-N. A point block 202a-N refers to a block of a data structure that stores at least a portion of point cloud data. A size block 204a-N refers to a block of a data structure that stores an indicator of a size of a corresponding point block 202a-N.

Each point block 202a-N may be associated with a size block 204a-N that immediately precedes it in the point cloud data structure. A size block 204a-N may be a block that stores an indicator of the size of a point block to which it corresponds. The last block 206 of a point cloud data structure may be a value indicating the end of a LiDAR sweep. For example, as illustrated in FIG. 2A, the last block 206 may have a value of '0'.

Each point block 202a-N may include information about LiDAR points that are obtained such as, for example, associated coordinate values. Coordinate values may include x, y, z values in the Cartesian coordinate system. Coordinate values may include an azimuth coordinate and/or an elevation coordinate in a spherical coordinate system.

FIG. 2B illustrates an example of an alternate point cloud data structure. As shown in FIG. 2B, a point cloud data structure may include a header block 200 and one or more point blocks 202a-N. Rather than having separate size blocks, as illustrated in FIG. 2B, the example point cloud data structure shown in FIG. 2B may store an indicator of the size of a point block within the applicable point block.

Figure 3:
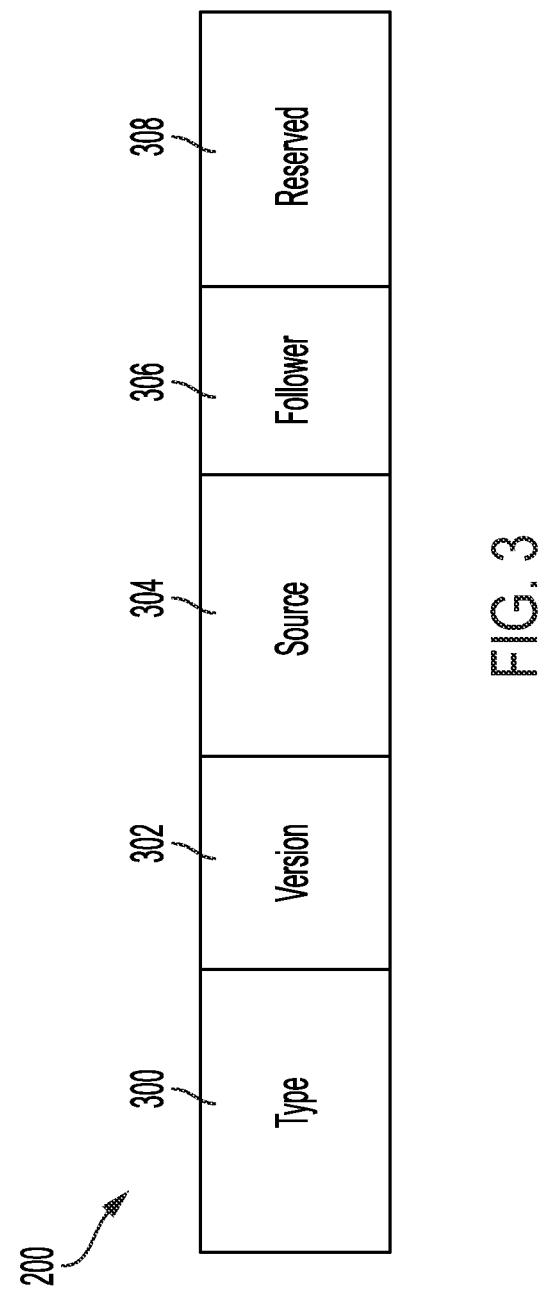
FIG. 3 illustrates an example organization of a header block of a point cloud data structure.

FIG. 3 illustrates an example organization of a header block 200 of a point cloud data structure. A header block refers to a block of a data structure that stores information or data that is relevant to the data structure. As illustrated in FIG. 3, a header block 200 may include a type portion 300, a version portion 302, a source portion 304, a follower portion 306, and/or a reserved portion 308. A portion may refer to a certain partition or segment of a header block. A portion may also refer to information that is included within a header block.

The type portion 300 may include an indicator of the data type associated with the data structure. For instance, with respect to a point cloud data structure, the data type portion may include an indicator that the data type is point cloud data structure. The version portion 302 may include an indicator of a version of the data structure such as, for example, for purposes of version control. The source portion 304 may include an indicator a source of raw LiDAR point data. Example sources may include, for example, short-range LiDAR, long-range LiDAR, and/or the like. The follower portion 306 may include an indicator of the type of the data structure that follows the current data structure in memory. For example, if a first point cloud data structure is followed by a second point cloud data structure in memory, the follower portion of the header of the first point cloud data structure may include an indication that the data structure that follows the first point cloud data structure in memory is a point cloud data structure. As another example, if a point cloud data structure is followed by an image data structure (as described in more detail below) in memory, the follower portion of the header of the point cloud data structure may include an indication that the data structure that follows the point cloud data structure in memory is an image data structure.

In various embodiments, the reserved portion 308 may serve as a placeholder for future fields or portions that may be added to the data structure in the future.

A point cloud data structure may be constructed to accommodate an unlimited number of point blocks 202a-N, as a point cloud data structure may be constructed based on a stream of LiDAR point cloud data. As such, a point cloud data structure may support the incremental construction of point blocks and size blocks.

In various embodiments, one or more electronic devices may construct 104 a point cloud data structure by allocating at least a portion of received LiDAR point cloud data to one or more point blocks of the point cloud data structure such that such LiDAR point cloud data populates such point blocks. For example, for each frame that is received, the one or more electronic devices may populate a point block of a point cloud data structure with the LiDAR point cloud data that is within the frame. The one or more electronic devices may populate a size block associated with the point block with the number of points in the point cloud.

Figure 4A:
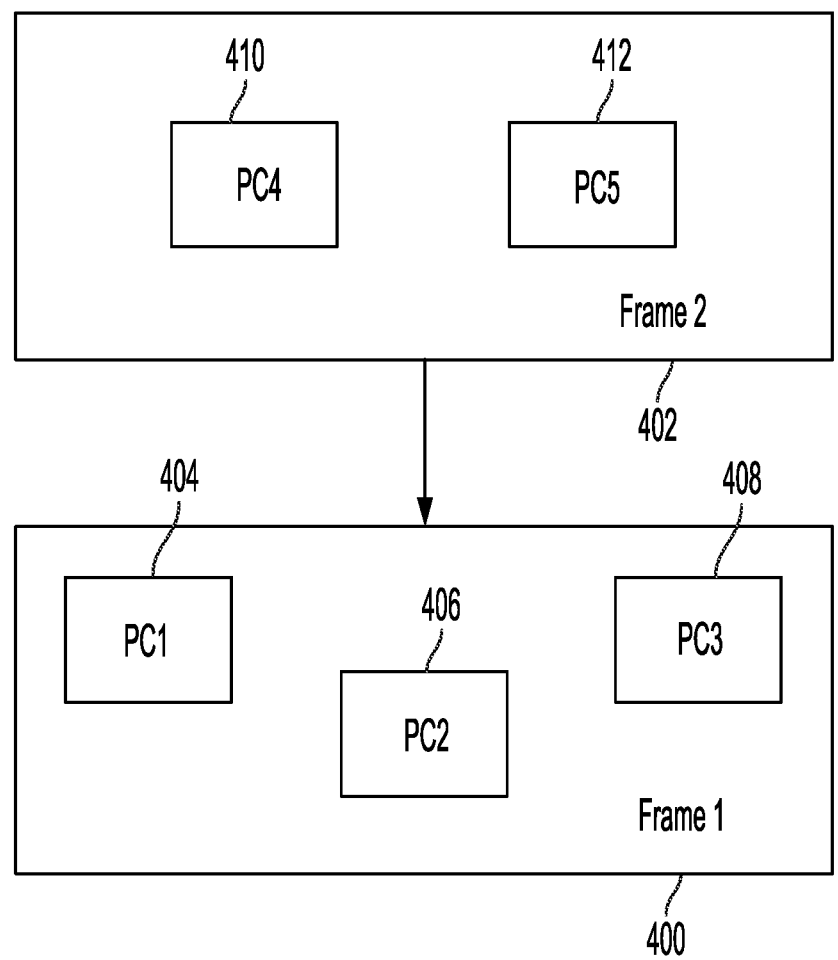
FIG. 4A illustrates an example LiDAR point cloud data stream.

FIG. 4A illustrates an example LiDAR point cloud data stream having two frames, Frame 1 400 and Frame 2 402. Frame 1 400 includes point cloud data points 1 404, 2, 406, and 3 408, while Frame 2 402 includes point cloud data points 4 410 and 5 412.

Figure 4B:
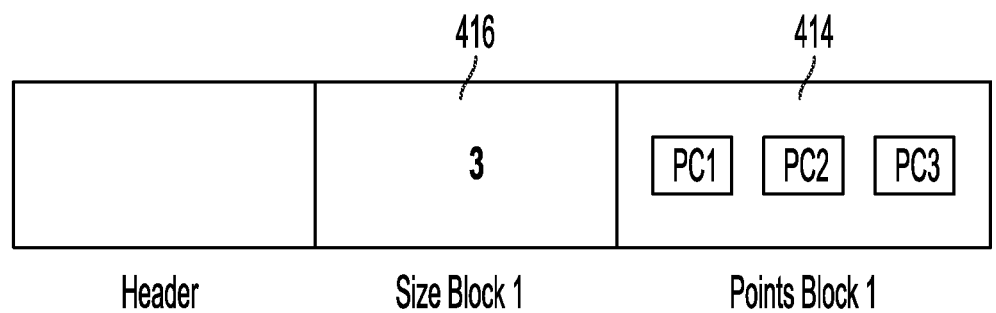
FIGS. 4B and 4C illustrate an example point cloud data structure.
Figure 4C:
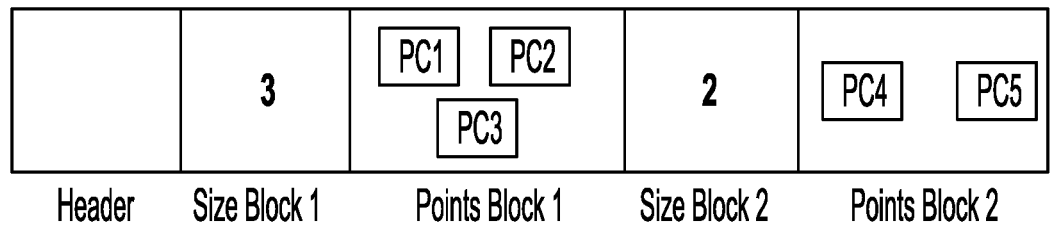

FIG. 4B illustrates an example point cloud data structure that includes Frame 1 400. As illustrated in FIG. 4B, the point cloud data points of Frame 1 400 (point cloud data points 1, 2 and 3) have been added to point block 1 414. Size block 1 416 associated with point block 1 414 is populated with the number of point cloud data points stored in point block 1 (i.e., '3'). FIG. 4C illustrates an example point cloud data structure that includes Frame 1 400 and Frame 2 402.

Referring back to FIG. 1, the one or more electronic devices may construct 106 an image data structure based on at least a portion of the LiDAR point cloud data associated with the frames that are sent by an autonomous vehicle. An image data structure may be formulated to have one or more header columns and one or more image columns. FIG. 5 illustrates an example image data structure.

As illustrated in FIG. 5, an image data structure may include a header block 500 and one or more image column blocks 502a-N. An image column block 502a-N refers to a block of a data structure that stores one or more pixels associated with LiDAR data. An image data structure may be a pixel block based pixel structure. The image data structure may be constructed to accommodate an unlimited number of pixel columns. As such, an image data structure may support the incremental construction of pixel columns.

Each image column block 502a-N may store a column of pixels of a corresponding image, which corresponds to a vertical capture of one or more LiDAR sensors. The corresponding image may be one represented by a frame of the LiDAR data point cloud data. Each frame may represent a unique image.

Figure 6:
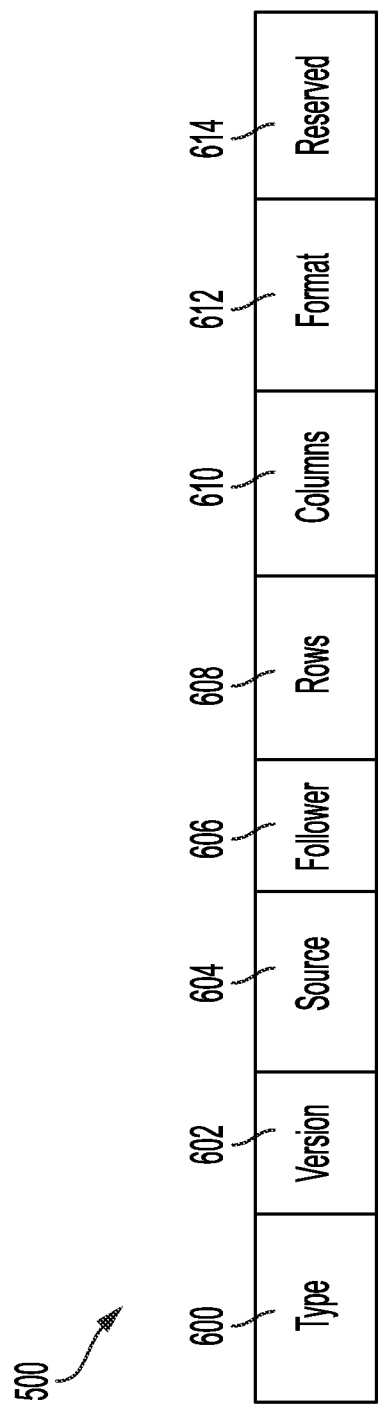
FIG. 6 illustrates an example organization of a header block of an image data structure.

FIG. 6 illustrates an example organization of a header block 200 of an image data structure. As illustrated in FIG. 6, a header block 500 may include a type portion 600, a version portion 602, a source portion 604, a follower portion 606, a rows portion 608, a columns portion 610, a format portion 612, and a reserved portion 614.

The type portion 600 may indicate the data type of the data structure. For example, with respect to an image data structure, the data type portion may include an indicator that the data type is an image data structure. The version portion 602 may be used to indicate a version of the data structure such as, for example, for purposes of version control. The source portion 604 may indicate a source of raw LiDAR point data. Example sources may include, for example, short-range LiDAR, long-range LiDAR, and/or the like.

The follower portion 606 may indicate the type of the data structure that follows the current data structure. For example, if a first image data structure is followed by a second image data structure in memory, the follower portion of the header of the first image data structure may include an indication that the data structure that follows the first image data structure in memory is an image data structure. As another example, if an image data structure is followed by a point cloud data structure in memory, the follower portion of the header of the image data structure may include an indication that the data structure that follows the image data structure in memory is a point cloud data structure.

The reserved portion 614 may serve as a placeholder for future fields or portions that may be added to the data structure in the future.

The rows portion 608 may include an indication of how many image columns are in the data structure. The columns portion 610 may include an indication of the size of an image column. The format portion 612 may include an indication of the format of each element within the image column.

An image data structure may be constructed to accommodate an unlimited number of image columns, as an image data structure may be designed as a pixel column block based pixel structure that matches the frame stream of LiDAR data. As such, an image data structure may support the incremental construction of pixel columns.

In various embodiments, one or more electronic devices may construct 106 an image data structure by allocating at least a portion of the received LiDAR point cloud data to one or more blocks of the image data structure. For example, for each frame that is received, the one or more electronic devices may populate an image column block of an image data structure with at least a portion of pixels corresponding to LiDAR point cloud data that is within the frame.

In various embodiments, a point cloud data structure and an image data structure may each be referred to as an "entity". Entities may be provided to a point cloud processing and/or analysis system individually or as chained pairs or multiples. A chained pair or multiple of entities may be referred to as a "unit". Within a unit, one or more entities may include an indication as to whether another entity follows the entity in the unit or not.

One or more electronic devices may provide 108 a batch to a point cloud processing system. A point cloud analysis point cloud processing system refers to a system having one or more electronic devices and/or memory devices that are configured to accept point cloud data and/or other image data and transform this data into visualizations, animations, models, and/or other visual representations.

A batch may include zero or more point cloud data structures and/or image data structures. A batch may include an indication of what kind of entity or entities are included, for example, a point cloud data structure or image data structure.

Figure 7:
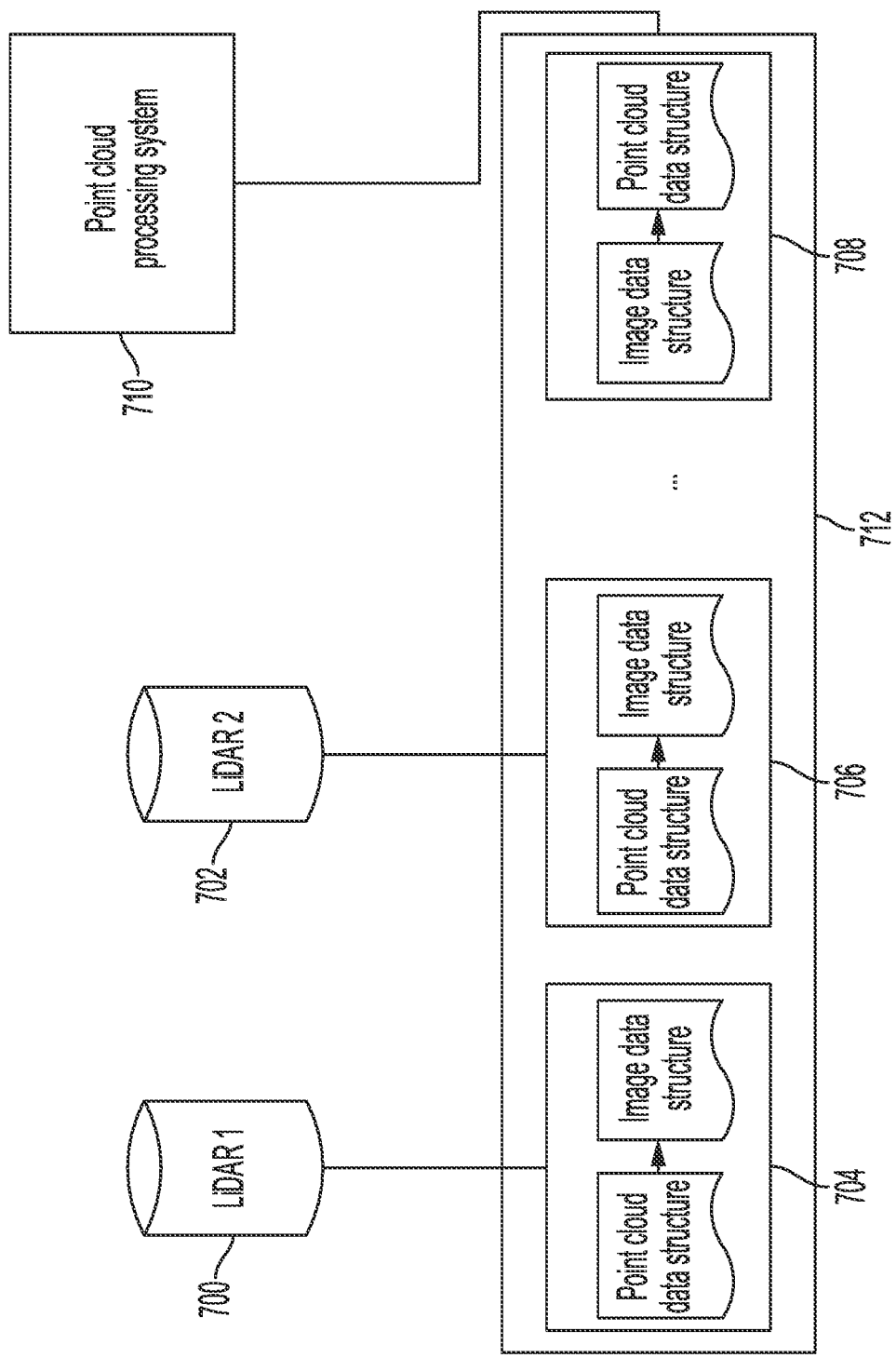
FIG. 7 illustrates an example batch.

FIG. 7 illustrates an example batch according to various embodiments. As illustrated by FIG. 7, unit 704 of the batch 712 is received from one or sensors of a first LiDAR 700, while unit 706 of the batch is received from one or more sensors of a second LiDAR 702. At least a portion of the batch 712 may be provided to a point cloud processing system 710, as described above.

Figure 8:
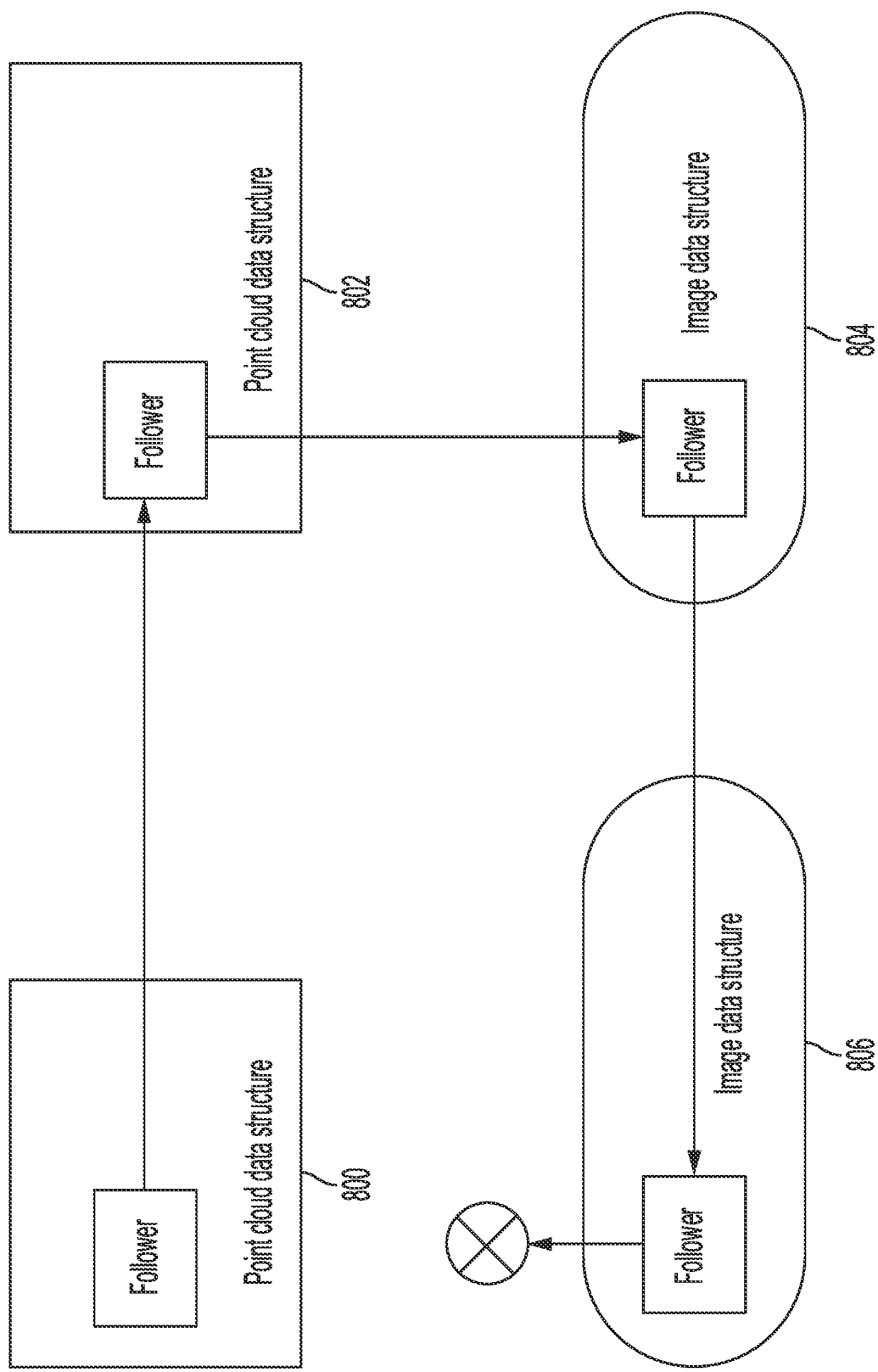
FIG. 8 illustrates an example batch.

FIG. 8 illustrates another example batch according to various embodiments. As illustrated in FIG. 8, a batch 800 may include two point cloud data structures 802, 804 and two image data structures 806, 808. The follower portion of each data structure may include an indication of the data structure that follows it in the batch. For instance, the follower portion of the header of point cloud data structure 802 may include an indication that point cloud data structure 804 follows it in the batch 800. Similarly, the follower portion of the header of point cloud data structure 804 may include an indication that image data structure 806 follows it in the batch. The follower portion of the header of the last data structure in the batch (e.g., image data structure 808) may include an indication that there are no subsequent followers. For instance, the follower portion may include a '0', a null value, or some other indicator.

A point cloud processing system may process at least a portion of a batch to generate one or more visualizations of the point cloud data. For example, a point cloud processing system may apply one or more algorithms and/or models to at least a portion of a batch to generate one or visualizations of the data. These visualizations may include, without limitation, one or more 3D models, one or more animations, and/or the like. A point cloud processing system may cause one or more visualizations to be displayed on a display device. As such, point cloud data may be received from various LiDAR sources on an on-going basis, transformed into a common format, and provided to a point cloud processing system so that the captured point cloud data can be visualized.

Figure 9:
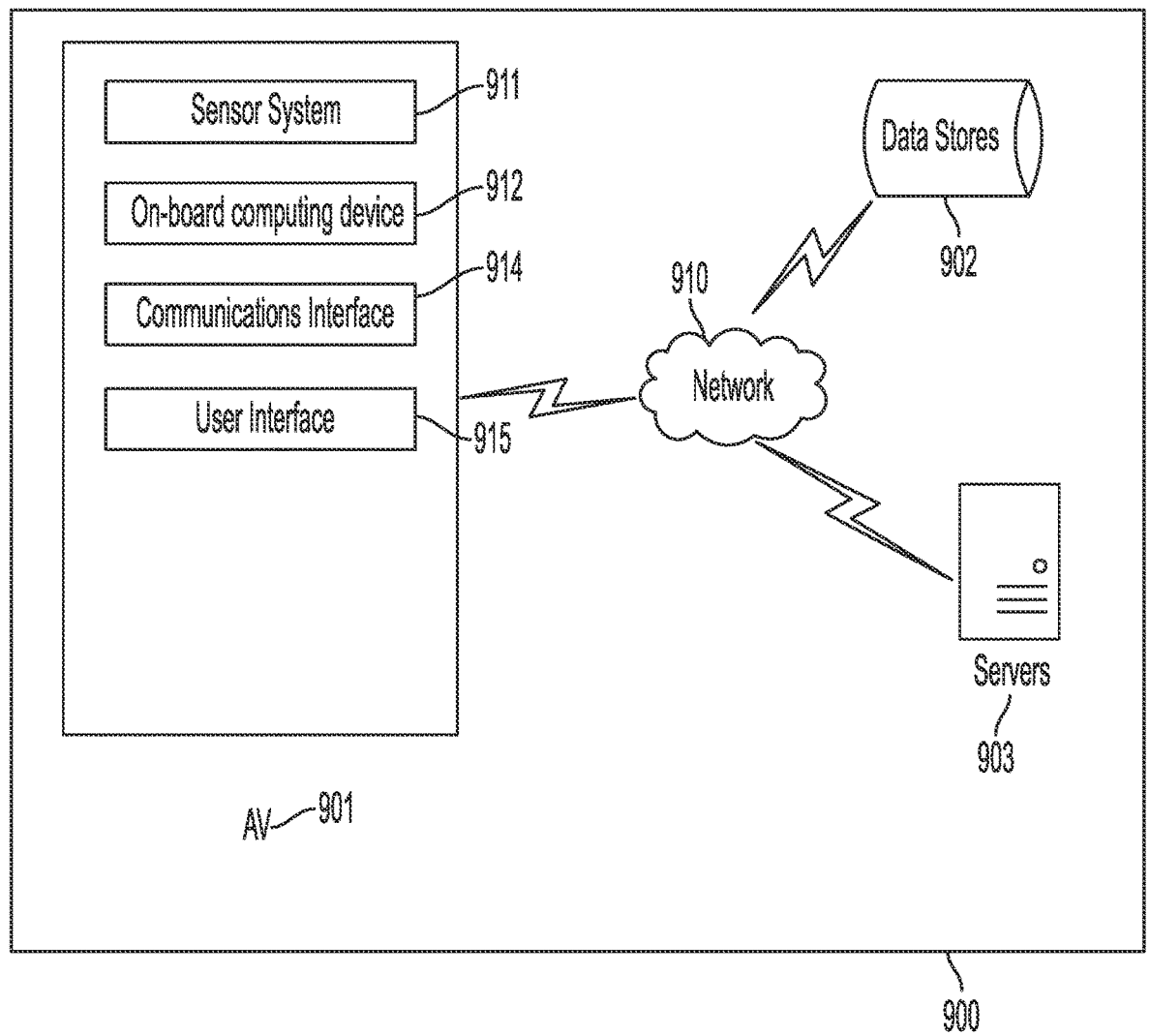
FIG. 9 is a block diagram illustrating an example autonomous vehicle system.

FIG. 9 is a block diagram illustrating an example system 900 that includes an autonomous vehicle 901 in communication with one or more data stores 902 and/or one or more servers 903 via a network 910. Although there is one autonomous vehicle shown, multiple autonomous vehicles may be coupled to each other and/or coupled to data stores 902 and/or servers 903 over network 910. Network 910 may be any type of network such as a local area network (LAN), a wide area network (WAN) such as the Internet, a cellular network, a satellite network, or a combination thereof, and may be wired or wireless. Data store(s) 902 may be any kind of data stores such as, without limitation, map data store(s), traffic information data store(s), user information data store(s), point of interest data store(s), or any other type of content data store(s). Server(s) 903 may be any kind of servers or a cluster of servers, such as, without limitation, Web or cloud servers, application servers, backend servers, or a combination thereof.

As illustrated in FIG. 9, the autonomous vehicle 901 may include a sensor system 911, an on-board computing device 912, a communications interface 914, and a user interface 915. Autonomous vehicle 901 may further include certain components (as illustrated, for example, in FIG. 10) included in vehicles, such as, an engine, wheels, steering wheel, transmission, etc., which may be controlled by the on-board computing device 912 using a variety of communication signals and/or commands, such as, for example, acceleration signals or commands, deceleration signals or commands, steering signals or commands, braking signals or commands, etc.

The sensor system 911 may include one or more sensors that are coupled to and/or are included within the autonomous vehicle 901. Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 901, information about the environment itself, information about the motion of the autonomous vehicle 901, information about a route of the autonomous vehicle, or the like. As autonomous vehicle 901 travels over a surface, at least some of the sensors may collect data pertaining to the surface.

The LiDAR system may include a sensor configured to sense or detect objects and/or actors in an environment in which the autonomous vehicle 901 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals. The LiDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LiDAR system may be coupled to the first vehicle to scan a complete 360° horizon of the first vehicle. The LiDAR system may be configured to provide to the computing device a cloud of point data representing the surface(s), which have been hit by the laser. The points may be represented by the LiDAR system in terms of azimuth and elevation angles, in addition to range, which can be converted to (X, Y, Z) point data relative to a local coordinate frame attached to the vehicle. Additionally, the LiDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, The LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 901 such as, without limitation, other vehicles (autonomous or driven), robots, satellites, etc.

Figure 10:
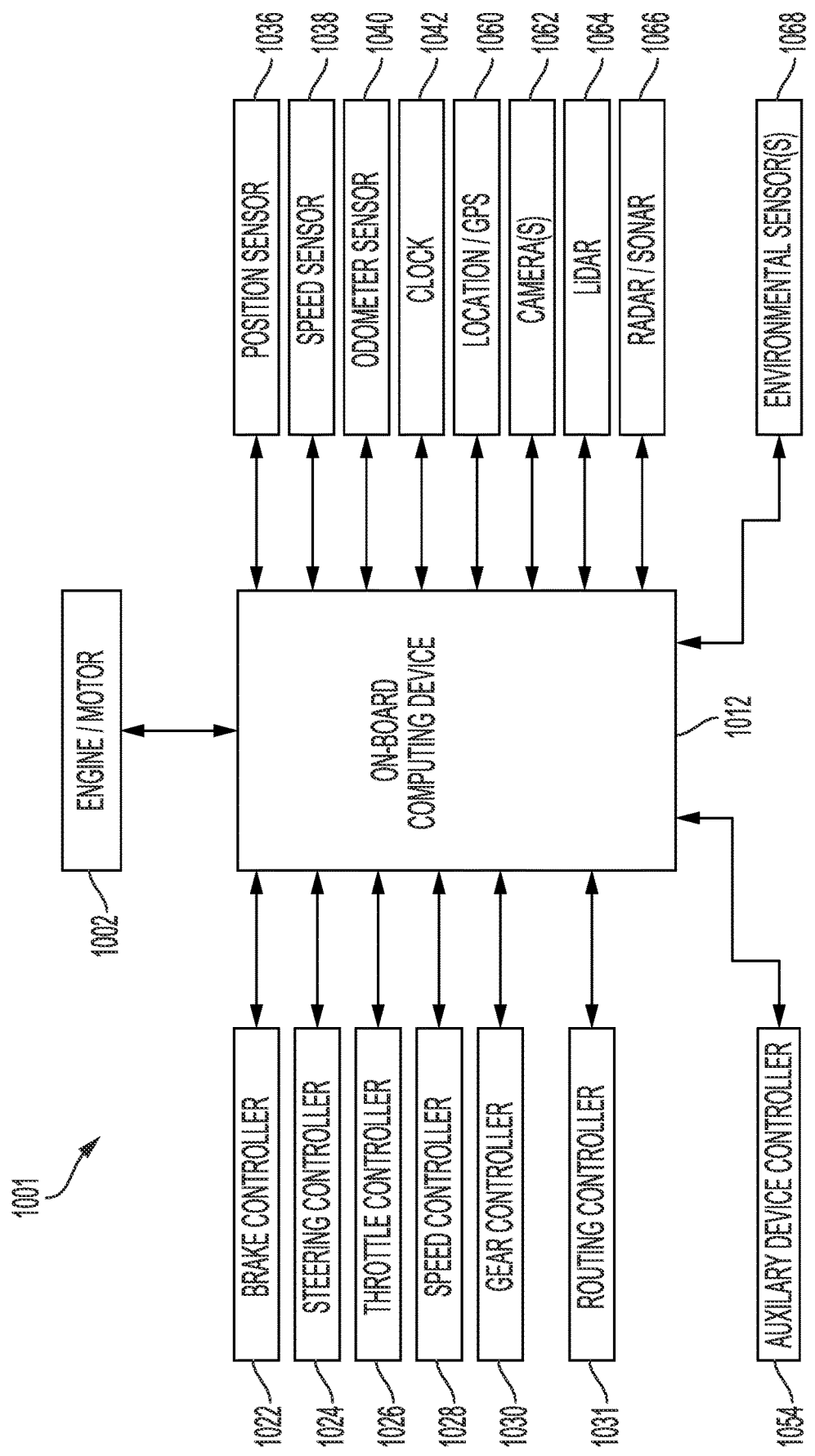
FIG. 10 illustrates an example vehicle controller system.

FIG. 10 illustrates an example system architecture for a vehicle 1001, such as the autonomous vehicle 901 of FIG. 1 autonomous vehicle. The vehicle 1001 may include an engine or motor 1002 and various sensors for measuring various parameters of the vehicle and/or its environment. Operational parameter sensors that are common to both types of vehicles include, for example: a position sensor 1036 such as an accelerometer, gyroscope and/or inertial measurement unit; a speed sensor 1038; and an odometer sensor 1040. The vehicle 1001 also may have a clock 1042 that the system architecture uses to determine vehicle time during operation. The clock 1042 may be encoded into the vehicle on-board computing device 1012, it may be a separate device, or multiple clocks may be available.

The vehicle 1001 also may include various sensors that operate to gather information about the environment in which the vehicle is traveling. These sensors may include, for example: a location sensor 1060 such as a GPS device; object detection sensors such as one or more cameras 1062; a LiDAR sensor system 1064; and/or a radar and or and/or a sonar system 1066. The sensors also may include environmental sensors 1068 such as a precipitation sensor and/or ambient temperature sensor. The object detection sensors may enable the vehicle 1001 to detect objects that are within a given distance or range of the vehicle 1001 in any direction, while the environmental sensors collect data about environmental conditions within the vehicle's area of travel. The system architecture will also include one or more cameras 1062 for capturing images of the environment.

During operations, information is communicated from the sensors to an on-board computing device 1012. The on-board computing device 1012 analyzes the data captured by the sensors and optionally controls operations of the vehicle based on results of the analysis. For example, the on-board computing device 1012 may control braking via a brake controller 1022; direction via a steering controller 1024; speed and acceleration via a throttle controller 1026 (in a gas-powered vehicle) or a motor speed controller 1028 (such as a current level controller in an electric vehicle); a differential gear controller 1030 (in vehicles with transmissions); and/or other controllers such as an auxiliary device controller 1054.

Geographic location information may be communicated from the location sensor 260 to the on-board computing device 1012, which may then access a map of the environment that corresponds to the location information to determine known fixed features of the environment such as streets, buildings, stop signs and/or stop/go signals. Captured images from the cameras 1062 and/or object detection information captured from sensors such as a LiDAR system 1064 is communicated from those sensors) to the on-board computing device 1012. The object detection information and/or captured images may be processed by the on-board computing device 1012 to detect objects in proximity to the vehicle 1001. In addition or alternatively, the vehicle 1001 may transmit any of the data to a remote server system 903 (FIG. 1) for processing. Any known or to be known technique for making an object detection based on sensor data and/or captured images can be used in the embodiments disclosed in this document.

The on-board computing device 1012 may obtain, retrieve, and/or create map data that provides detailed information about the surrounding environment of the autonomous vehicle 1001. The on-board computing device 1012 may also determine the location, orientation, pose, etc. of the AV in the environment (localization) based on, for example, three dimensional position data (e.g., data from a GPS), three dimensional orientation data, predicted locations, or the like. For example, the on-board computing device 1012 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 1012 in analyzing the surrounding environment of the autonomous vehicle 1001.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 1012 may also include and/or may receive information relating to the trip or route of a user, real-time traffic information on the route, or the like.

The on-board computing device 1012 may include and/or may be in communication with a routing controller 1031 that generates a navigation route from a start position to a destination position for an autonomous vehicle. The routing controller 1031 may access a map data store to identify possible routes and road segments that a vehicle can travel on to get from the start position to the destination position. The routing controller 1031 may score the possible routes and identify a preferred route to reach the destination. For example, the routing controller 1031 may generate a navigation route that minimizes Euclidean distance traveled or other cost function during the route, and may further access the traffic information and/or estimates that can affect an amount of time it will take to travel on a particular route. Depending on implementation, the routing controller 1031 may generate one or more routes using various routing methods, such as Dijkstra's algorithm, Bellman-Ford algorithm, or other algorithms. The routing controller 1031 may also use the traffic information to generate a navigation route that reflects expected conditions of the route (e.g., current day of the week or current time of day, etc.), such that a route generated for travel during rush-hour may differ from a route generated for travel late at night. The routing controller 1031 may also generate more than one navigation route to a destination and send more than one of these navigation routes to a user for selection by the user from among various possible routes.

In various embodiments, an on-board computing device 1012 may determine perception information of the surrounding environment of the autonomous vehicle 1001. Based on the sensor data provided by one or more sensors and location information that is obtained, the on-board computing device 1012 may determine perception information of the surrounding environment of the autonomous vehicle 1001. The perception information may represent what an ordinary driver would perceive in the surrounding environment of a vehicle. The perception data may include information relating to one or more objects in the environment of the autonomous vehicle 1001. For example, the on-board computing device 1012 may process sensor data (e.g., LiDAR or RADAR data, camera images, etc.) in order to identify objects and/or features in the environment of autonomous vehicle 1001. The objects may include traffic signals, road way boundaries, other vehicles, pedestrians, and/or obstacles, etc. The on-board computing device 1012 may use any now or hereafter known object recognition algorithms, video tracking algorithms, and computer vision algorithms (e.g., track objects frame-to-frame iteratively over a number of time periods) to determine the perception.

In some embodiments, the on-board computing device 1012 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 1012 may perform one or more prediction and/or forecasting operations. For example, the on-board computing device 1012 may predict future locations, trajectories, and/or actions of one or more objects. For example, the on-board computing device 1012 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 1001, the surrounding environment, and/or their relationship(s). For example, if an object is a vehicle and the current driving environment includes an intersection, the on-board computing device 1012 may predict whether the object will likely move straight forward or make a turn. If the perception data indicates that the intersection has no traffic light, the on-board computing device 1012 may also predict whether the vehicle may have to fully stop prior to enter the intersection.

In various embodiments, the on-board computing device 1012 may determine a motion plan for the autonomous vehicle. For example, the on-board computing device 1012 may determine a motion plan for the autonomous vehicle based on the perception data and/or the prediction data. Specifically, given predictions about the future locations of proximate objects and other perception data, the on-board computing device 1012 can determine a motion plan for the autonomous vehicle 1001 that best navigates the autonomous vehicle relative to the objects at their future locations.

In one or more embodiments, the on-board computing device 1012 may receive predictions and make a decision regarding how to handle objects and/or actors in the environment of the autonomous vehicle 1001. For example, for a particular actor (e.g., a vehicle with a given speed, direction, turning angle, etc.), the on-board computing device 1012 decides whether to overtake, yield, stop, and/or pass based on, for example, traffic conditions, map data, state of the autonomous vehicle, etc. Furthermore, the on-board computing device 1012 also plans a path for the autonomous vehicle 1001 to travel on a given route, as well as driving parameters (e.g., distance, speed, and/or turning angle). That is, for a given object, the on-board computing device 1012 decides what to do with the object and determines how to do it. For example, for a given object, the on-board computing device 1012 may decide to pass the object and may determine whether to pass on the left side or right side of the object (including motion parameters such as speed). The on-board computing device 1012 may also assess the risk of a collision between a detected object and the autonomous vehicle 1001. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 1012 may execute one or more control instructions to perform a cautious maneuver (e.g., mildly slow down, accelerate, change lane, or swerve). In contrast, if the collision cannot be avoided, then the on-board computing device 912 may execute one or more control instructions for execution of an emergency maneuver (e.g., brake and/or change direction of travel).

As discussed above, planning and control data regarding the movement of the autonomous vehicle is generated for execution. The on-board computing device 1012 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 9, the communications interface 914 may be configured to allow communication between autonomous vehicle 901 and external systems, such as, for example, external devices, sensors, other vehicles, servers, data stores, databases etc. Communications interface 914 may utilize any now or hereafter known protocols, protection schemes, encodings, formats, packaging, etc. such as, without limitation, Wi-Fi, an infrared link, Bluetooth, etc. User interface system 915 may be part of peripheral devices implemented within vehicle 901 including, for example, a keyword, a touch screen display device, a microphone, and a speaker, etc.

Figure 11:
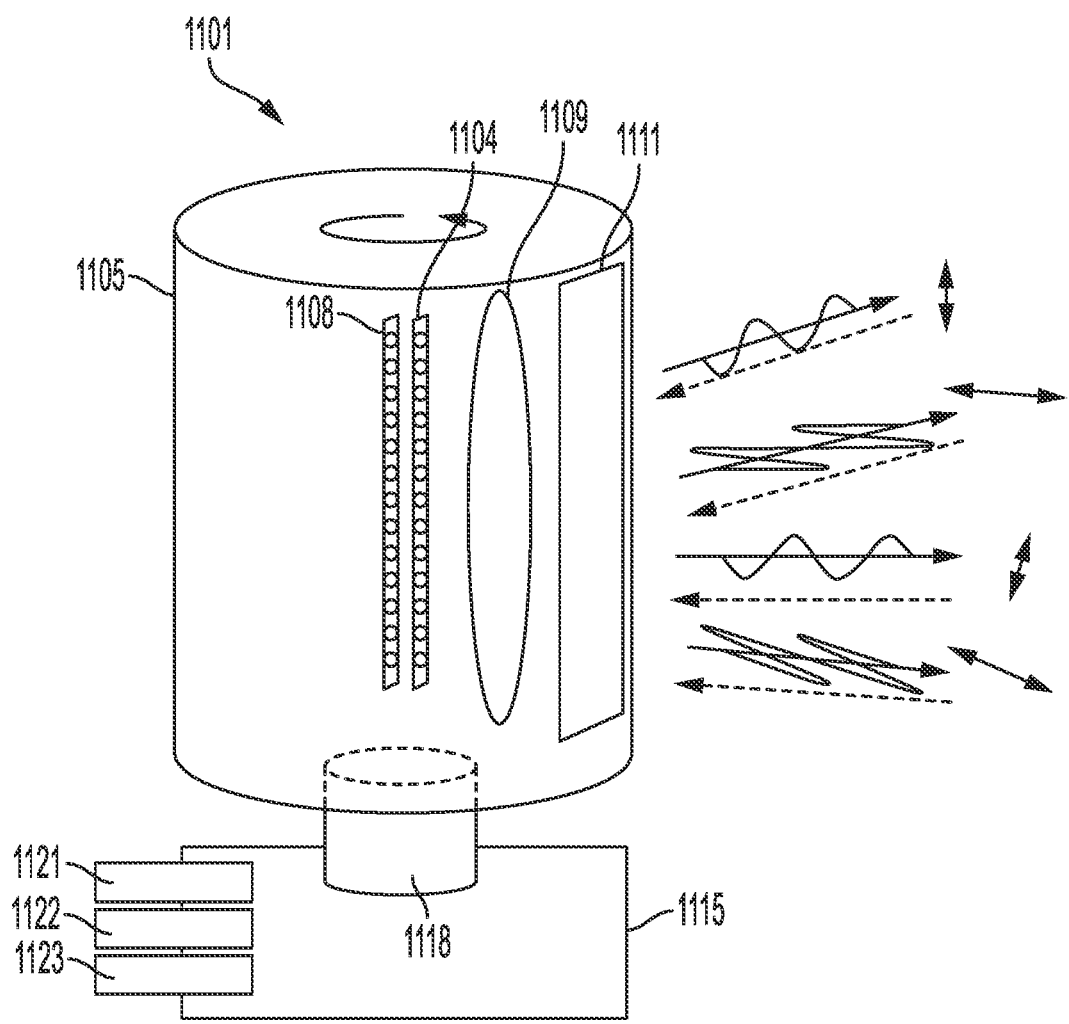
FIG. 11 shows an example LiDAR system.

FIG. 11 shows an example LiDAR system 1101 as may be used in various embodiments. As shown in FIG. 11, the LiDAR system 1101 includes a housing 1105 which may be rotatable 360° about a central axis such as hub or axle 1118. The housing may include an emitter/receiver aperture 1111 made of a material transparent to light. Although the example shown in FIG. 11 has a single aperture, in various embodiments, multiple apertures for emitting and/or receiving light may be provided. Either way, the system can emit light through one or more of the aperture(s) 1111 and receive reflected light back toward one or more of the aperture(s) 1111 as the housing 1105 rotates around the internal components. In an alternative embodiment, the outer shell of housing 1105 may be a stationary dome, at least partially made of a material that is transparent to light, with rotatable components inside of the housing 1105.

Inside the rotating shell or stationary dome is a light emitter system 1104 that is configured and positioned to generate and emit pulses of light through the aperture 1111 or through the transparent dome of the housing 1105 via one or more laser emitter chips or other light emitting devices. The emitter system 1104 may include any number of individual emitters, including for example 8 emitters, 64 emitters or 128 emitters. The emitters may emit light of substantially the same intensity, or of varying intensities. The individual beams emitted by 1104 will have a well-defined state of polarization that is not the same across the entire array. As an example, some beams may have vertical polarization and other beams may have horizontal polarization. The LiDAR system will also include a light detector 1108 containing a photodetector or array of photodetectors positioned and configured to receive light reflected back into the system. The emitter system 1104 and detector 1108 would rotate with the rotating shell, or they would rotate inside the stationary dome of the housing 1105. One or more optical element structures 1109 may be positioned in front of the light emitting unit 1104 and/or the detector 1108 to serve as one or more lenses or waveplates that focus and direct light that is passed through the optical element structure 1109.

One or more optical element structures 1109 may be positioned in front of the mirror to focus and direct light that is passed through the optical element structure 1109. As shown below, the system includes an optical element structure 1109 positioned in front of the mirror and connected to the rotating elements of the system so that the optical element structure 1109 rotates with the mirror. Alternatively or in addition, the optical element structure 1109 may include multiple such structures (for example lenses and/or waveplates). Optionally, multiple optical element structures 1109 may be arranged in an array on or integral with the shell portion 1111.

Optionally, each optical element structure 1109 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 1121 to power the laser emitter unit 1104, a motor, and electronic components. The LiDAR system will also include an analyzer 1115 with elements such as a processor 1122 and non-transitory computer-readable memory 1123 containing programming instructions that are configured to enable the system to receive data collected by the light detector unit, analyze it to measure characteristics of the light received, and generate information that a connected system can use to make decisions about operating in an environment from which the data was collected. Optionally, the analyzer 1115 may be integral with the LiDAR system 1101 as shown, or some or all of it may be external to the LiDAR system and communicatively connected to the LiDAR system via a wired or wireless communication network or link.

Figure 12:
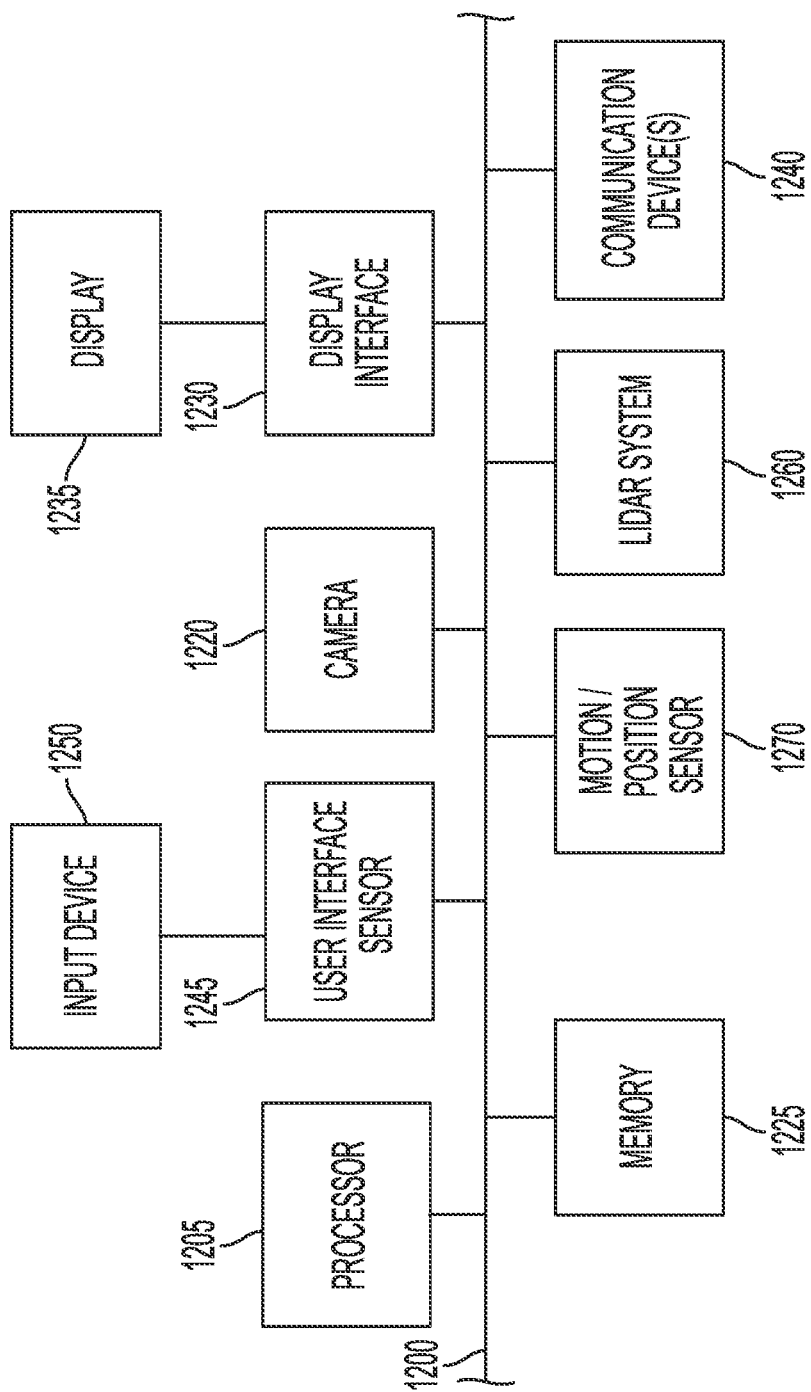
FIG. 12 is a block diagram that illustrates various elements of a possible electronic system, subsystem, controller and/or other component of an AV, and/or external electronic device.

FIG. 12 depicts an example of internal hardware that may be included in any of the electronic components of the system, such as internal processing systems of the AV, external monitoring and reporting systems, or remote servers. An electrical bus 1200 serves as an information highway interconnecting the other illustrated components of the hardware. Processor 1205 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1225. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 1230 may permit information from the bus 1200 to be displayed on a display device 1235 in visual, graphic or alphanumeric format, such on an in-dashboard display system of the vehicle. An audio interface and audio output (such as a speaker) also may be provided. Communication with external devices may occur using various communication devices 1240 such as a wireless antenna, a radio frequency identification (RFID) tag and/or short-range or near-field communication transceiver, each of which may optionally communicatively connect with other components of the device via one or more communication system. The communication device(s) 1240 may be configured to be communicatively connected to a communications network, such as the Internet, a local area network or a cellular telephone data network.

The hardware may also include a user interface sensor 1245 that allows for receipt of data from input devices 1250 such as a keyboard or keypad, a joystick, a touchscreen, a touch pad, a remote control, a pointing device and/or microphone. Digital image frames also may be received from a camera 1220 that can capture video and/or still images. The system also may receive data from a motion and/or position sensor 1270 such as an accelerometer, gyroscope or inertial measurement unit. The system also may receive data from a LiDAR system 1260 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object."

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A system, comprising:
   an electronic device; and
   a computer-readable medium comprising one or more programming instructions that, when executed, cause the electronic device to:
      receive a stream of one or more frames of LiDAR data from each of a plurality of autonomous vehicles, wherein each said one or more frames of LiDAR data comprises point cloud data representing a respective image of a plurality of images;
      translating different data formats of the Lidar data received from the plurality of autonomous vehicles into a common format by performing operations to:
         assign at least a portion of the LiDAR data into one or more point cloud data structures, wherein each point cloud data structure comprises:
            a first header block, and
            a plurality of point blocks that each comprises all LIDAR points contained in a respective frame of the one or more frames; and
         assign at least a portion of the LiDAR data into one or more image data structures, wherein the image data structure comprises:
            a second header block, and
            a plurality of image column blocks, in which each image column block comprises a respective column of pixels of a corresponding image of the plurality of images, and in which the plurality of image column blocks collectively contain all pixels of the corresponding image;
      generate a batch comprising one or more of the point cloud data structures and/or one or more of the image data structures; and
      provide the batch to a point cloud processing system.

2. The system of claim 1, wherein the one or more programming instructions that, when executed, cause the electronic device to assign at least a portion of the LiDAR data into one or more point cloud data structures comprises one or more programming instructions that, when executed, cause the electronic device to store part of the at least a portion of the LiDAR data in each of the plurality of point blocks.

3. The system of claim 2, wherein the first header block comprises a source indicator that identifies a source of the LiDAR data that is stored in the plurality of point blocks.

4. The system of claim 1, wherein one or more of the point cloud data structures comprises, for each of the point blocks, a size block that immediately precedes the corresponding point block and that includes an indicator of size of the corresponding point block.

5. The system of claim 1, wherein one or more of the plurality of point blocks comprise an indicator of size of the point block.

6. The system of claim 1, wherein the first header block comprises an indicator indicating which one of a plurality of different data structure types the first header is associated with.

7. The system of claim 1, wherein the first header block comprises a follower indicator that identifies which of a plurality of different data structure types is a data structure that follows the point cloud data structure in memory.

8. The system of claim 1, wherein the one or more programming instructions that, when executed, cause the electronic device to assign at least a portion of the LiDAR data into one or more image data structures comprises one or more programming instructions that, when executed, cause the electronic device to store part of the at least a portion of the LiDAR data in each of the plurality of image column blocks.

9. The system of claim 8, wherein the second header comprises a source indicator that identifies a source of the LiDAR data that is stored in the plurality of image column blocks.

10. The system of claim 1, wherein the second header block comprises a data type indicator indicating a data type of the image data structure.

11. The system of claim 1, wherein the second header block comprises a follower indicator that identifies a data type of a data structure that follows the image data structure in memory.

12. The system of claim 1, wherein the second header block comprises an indication of a how many image columns are stored by the corresponding image data structure.

13. The system of claim 1, wherein the second header block comprises an indication of a size of one or more of the image column blocks.

14. A system comprising a computer-readable memory for storage and retrieval of LiDAR data, the memory comprising:
one or more point cloud data structures, wherein each point cloud data structure comprises:
a first header block, and
a plurality of point blocks, wherein each of the plurality of point blocks is configured to store all LiDAR points contained in a respective frame of one or more frames of LIDAR point cloud data, wherein each said one or more frames of LIDAR point cloud data representing a respective image of the plurality of images; and
one or more image data structures, wherein the image data structure comprises:
a second header block, and
a plurality of image column blocks, in which each image column block comprises a respective column of pixels of a corresponding image from the LiDAR point cloud data, and in which the image column blocks collectively contain all pixels of the corresponding image.

15. A method, comprising:
by an electronic device:
receiving a stream of one or more frames of LiDAR data from each of a plurality of autonomous vehicles, wherein each said one or more frames of LiDAR data comprises point cloud data representing a respsective image of a plurality of;
assigning at least a portion of the LiDAR data into one or more point cloud data structures, wherein each point cloud data structure comprises:
a first header block, and
a plurality of point blocks that each comprises all LIDAR point contained in a respective frame of the one or more frames; and
assigning at least a portion of the LiDAR data into one or more image data structures, wherein the image data structure comprises:
a second header block, and
a plurality of image column blocks, in which each image column block comprises a respective column of pixels of a corresponding image of the plurality of images, and in which the image column blocks collectively contain all pixels of the corresponding image;
generating a batch comprising one or more of the point cloud data structures and/or one or more of the image data structures; and
providing the batch to a point cloud processing system.

16. The method of claim 15, wherein assigning at least a portion of the LiDAR data into one or more point cloud data structures comprises storing part of the at least a portion of the LiDAR data in each of the plurality of point blocks.

17. The method of claim 16, wherein the first header block comprises a source indicator that identifies a source of the LiDAR data that is stored in the plurality of point blocks.

18. The method of claim 15, wherein one or more of the point cloud data structures comprises, for each of the point blocks, a size block that immediately precedes the corresponding point block and that includes an indicator of size of the corresponding point block.

19. The method of claim 15, wherein one or more of the plurality of point blocks comprise an indicator of size of the point block.

20. The method of claim 15, wherein the first header block comprises a data type indicator indicating a data type of the point cloud data structure.

21. The method of claim 15, wherein the first header block comprises a follower indicator that identifies a data type of a data structure that follows the point cloud data structure in memory.

22. The method of claim 15, wherein assigning at least a portion of the LiDAR data into one or more image data structures comprises storing part of the at least a portion of the LiDAR data in each of the plurality of image column blocks.

23. The method of claim 22, wherein the second header comprises a source indicator that identifies a source of the LiDAR data that is stored in the plurality of image column blocks.

24. The method of claim 15, wherein the second header block comprises one or more of the following:
a data type indicator indicating a data type of the image data structure;
a follower indicator that identifies a data type of a data structure that follows the image data structure in memory;
an indication of a how many image columns are stored by the corresponding image data structure; or
an indication of a size of one or more of the image column blocks.

* * * * *